(12) United States Patent
Fukuda et al.

(10) Patent No.: US 10,464,211 B2
(45) Date of Patent: Nov. 5, 2019

(54) GENERATING CONTROL SIGNAL FOR TELE-PRESENCE ROBOT

(71) Applicant: International Business Machines Corporation, Armonk, NY (US)

(72) Inventors: Kentarou Fukuda, Tokyo (JP); Akihiro Kosugi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 15/246,599

(22) Filed: Aug. 25, 2016

(65) Prior Publication Data
US 2017/0057090 A1   Mar. 2, 2017

(30) Foreign Application Priority Data
Aug. 31, 2015   (JP) .................................. 2015-170787

(51) Int. Cl.
  B25J 9/16    (2006.01)
  H04N 7/14    (2006.01)

(52) U.S. Cl.
  CPC ........... *B25J 9/1689* (2013.01); *B25J 9/1697* (2013.01); *H04N 7/142* (2013.01)

(58) Field of Classification Search
  CPC ........ B25J 9/1689; B25J 9/1697; H04N 7/142
  USPC ....................................................... 700/259
  See application file for complete search history.

(56) References Cited

U.S. PATENT DOCUMENTS

| | | | |
|---|---|---|---|
| 6,879,879 B2 | 4/2005 | Jouppi et al. | |
| 2002/0057279 A1* | 5/2002 | Jouppi .................. | G06T 3/4038 345/619 |
| 2011/0190930 A1* | 8/2011 | Hanrahan .............. | B25J 9/0003 700/248 |
| 2012/0239196 A1* | 9/2012 | Olivier, III ............. | B25J 9/1689 700/259 |
| 2013/0030571 A1* | 1/2013 | Ruiz Morales ......... | G06F 3/013 700/259 |
| 2014/0028548 A1* | 1/2014 | Bychkov ................ | G06F 3/013 345/156 |

(Continued)

FOREIGN PATENT DOCUMENTS

| | | |
|---|---|---|
| CN | 2728726 Y | 9/2005 |
| CN | 1732687 A | 2/2006 |

(Continued)

OTHER PUBLICATIONS

Heuring, Jason J., et al., Slaving Head and Eye Movements for Visual Telepresence, British Machine Vision Conference, Department of Engineering Science, 1996, pp. 515-524, University of Oxford, Oxford, UK.

*Primary Examiner* — Stephen Holwerda
(74) *Attorney, Agent, or Firm* — Dmitry Paskalov

(57) ABSTRACT

A computer-implemented method for generating a control signal for a tele-presence robot by a computing device based on a movement of an operator, the method includes calculating a direction where at least part of the operator is positioned based on a camera acquiring an image of the at least part of the operator; calculating an orientation where the at least part of the operator points; and generating at least one motion parameters of the tele-presence robot as the control signal based on the direction in combination with the orientation, wherein the direction and the orientation are reflected to the at least one motion parameters differently.

19 Claims, 7 Drawing Sheets

(56) References Cited

U.S. PATENT DOCUMENTS

2014/0111601 A1* 4/2014 Lee .................. H04N 7/147
          348/14.08
2015/0288923 A1* 10/2015 Kim .................. H04N 5/23296
          348/14.05

FOREIGN PATENT DOCUMENTS

| CN | 101890719 A | 11/2010 |
| CN | 102395931 A | 3/2012 |
| JP | 2010529738 A | 8/2010 |
| JP | 2013050945 A | 3/2013 |
| WO | 2010067221 A1 | 6/2010 |

* cited by examiner

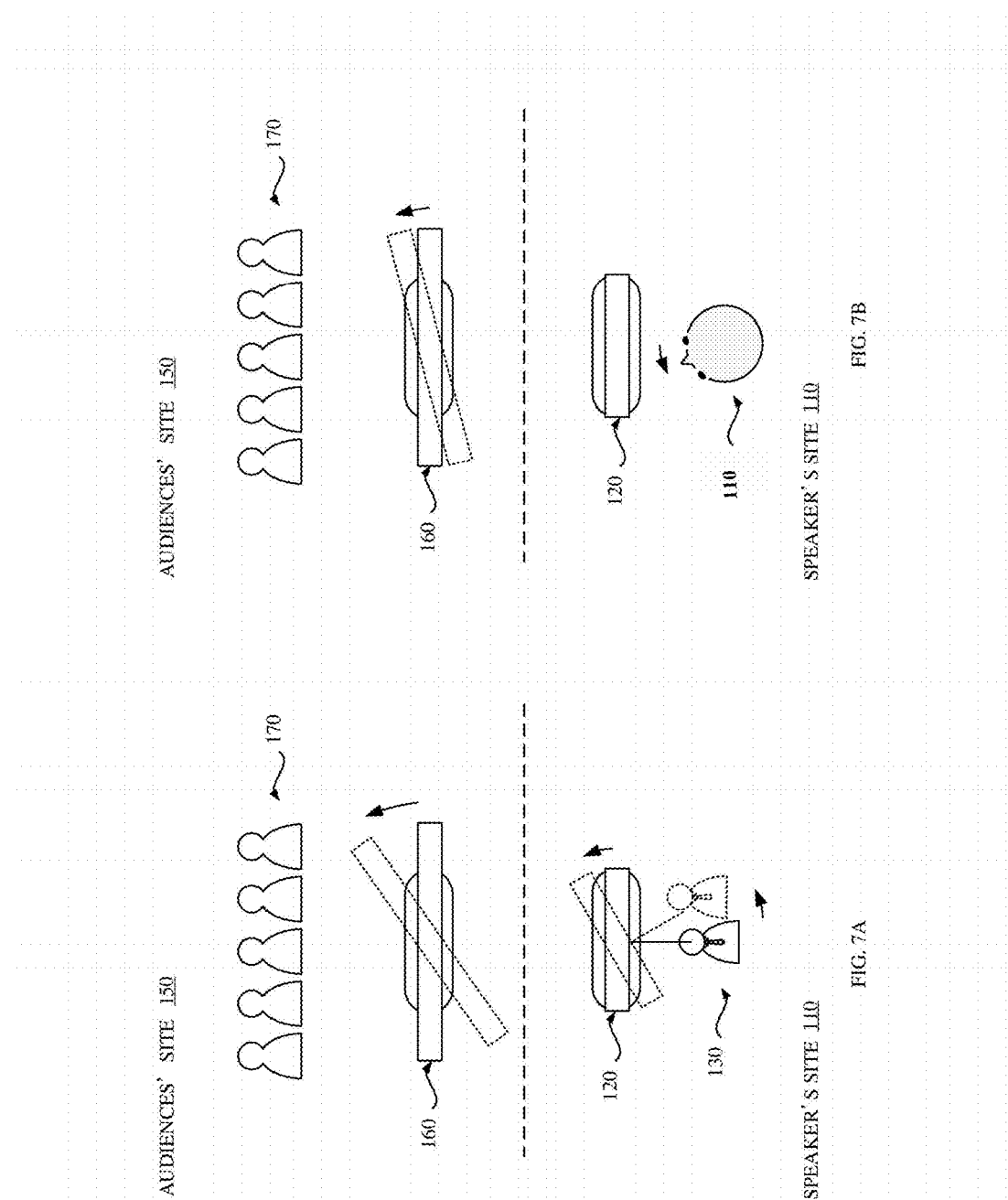

GENERATING CONTROL SIGNAL FOR TELE-PRESENCE ROBOT

CROSS-REFERENCE TO RELATED APPLICATION

This application claims the benefit of priority from Japanese Patent Application 2015-170787, filed on Aug. 31, 2015, the contents of which are incorporated herein by reference.

FIELD OF INVENTION

The present invention, generally, relates to tele-presence robots, more particularly, to methods, tele-presence systems and computer programs for generating a control signal for a tele-presence robot.

BACKGROUND

A tele-presence system for human-human communications for example, speaker-audience communication in a remote lecture class, tele-presence robots equipped with a pan-tilt motor, a display and a camera can be utilized for physically embodying one participant (e.g. a lecturer, speaker) to other participants (e.g. students, audiences). Major roles of the tele-presence robots include not only providing information about the other participants to the one participant, but also giving conformity to the other participants through social presence enhanced by the tele-presence robot. An operator in one site can control remotely the tele-presence robot moving their head; the robot can move its face with camera to provide the information around the robot in other site to the operator. The tele-presence robot expresses behavior of the operator by imitating a movement of the operator in order to convey his/her intents, characteristics, and circumstances to the other participant.

Controlling the tele-presence robot by using an input device for example, keyboards and controller devices puts cognitive load on the operator, resulting in performance degradation during cognitively complex tasks for example lectures, operating instructions, etc. The operator can forget controlling if he or she is too concentrated on his or her presentation, or the operator can not concentrate on his or her presentation if he or she is preoccupied with operations for controlling the robot.

Also, provided is a robot controlled by using Head Mount Display (HMD) equipped with gyro sensors, which replicates the movement of the operator to the remote robot. However, wearing such sensor device can be burden to the operator. Face covered with HMD results stiff facial expression, which can give less affinity to audiences. Awkward behaviors of the robot due to unintentional movement of the operator for example looking aside should also be considered.

SUMMARY OF THE INVENTION

This present invention provides methods, tele-presence systems and associated computer programs for generating a control signal for a tele-presence robot, capable of expressing natural embodiment of an operator with the tele-presence robot based on a movement of the operator, without requiring any additional equipment that disturbs natural expression of the operator and giving much cognitive load on the operator.

According to an embodiment of the present invention, there is provided a computer-implemented method for generating a control signal for a tele-presence robot by a computing device based on a movement of an operator. The method includes calculating a direction where at least part of the operator is positioned based on a camera that acquire an image of the at least part of the operator. The method also includes calculating an orientation where the at least part of the operator points. The method also includes generating at least one motion parameters of the tele-presence robot as the control signal based on the direction in combination with the orientation, in which the direction and the orientation are reflected to the at least one motion parameters differently.

According to another embodiment of the present invention, there is provided a tele-presence system that includes a computing device for generating a control signal for a tele-presence robot based on a movement of an operator. The computing device includes a direction calculator configured to calculate a direction where at least part of the operator is positioned based on a camera that acquires an image of the at least part of the operator. The computing device also includes an orientation calculator configured to calculate an orientation where the at least part of the operator points. The computing device further includes a generator configured to generate at least one motion parameters of the tele-presence robot as the control signal based on the direction in combination with the orientation, in which the direction and the orientation are reflected to the at least one motion parameters differently.

According to another embodiment of the present invention, there is a computer program for generating a control signal for a tele-presence robot based on a movement of an operator, the computer program having program instructions embodied therewith, the program instructions executable by a computer to cause the computer to perform a computer-implemented method. The computer-implemented method includes calculating a direction where at least part of the operator is positioned based on a camera acquiring an image of the at least part of the operator; calculating an orientation where the at least part of the operator points; and generating at least one motion parameters of the tele-presence robot as the control signal based on the direction in combination with the orientation, wherein the direction and the orientation are reflected to the at least one motion parameters differently.

Additional features and advantages are realized through the techniques of the present invention. Other embodiments and aspects of the invention are described in detail herein and are considered a part of the claimed invention.

BRIEF DESCRIPTION OF DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

FIG. 7A illustrates movements of tele-presence robots by an intentional movement of an operator according to a particular preferable embodiment of the present invention;

FIG. 7B illustrates movements of tele-presence robots by an unintentional movement of the operator according to the particular preferable embodiment of the present invention.

DETAILED DESCRIPTION OF THE PREFERRED EMBODIMENTS

Now, the present invention will be described using particular embodiments, and the embodiments described hereafter are understood to be only referred as examples and are not intended to limit the scope of the present invention.

At least one embodiments according to the present invention are directed to methods, tele-presence systems and computer programs for generating a control signal for a tele-presence robot by a computing device based on a movement of an operator.

Now, referring to the series of FIGS. 1-7, there is shown a tele-presence system and a method for generating a control signal for a tele-presence robot in the tele-presence system according to at least one embodiments of the present invention.

Figure 1:
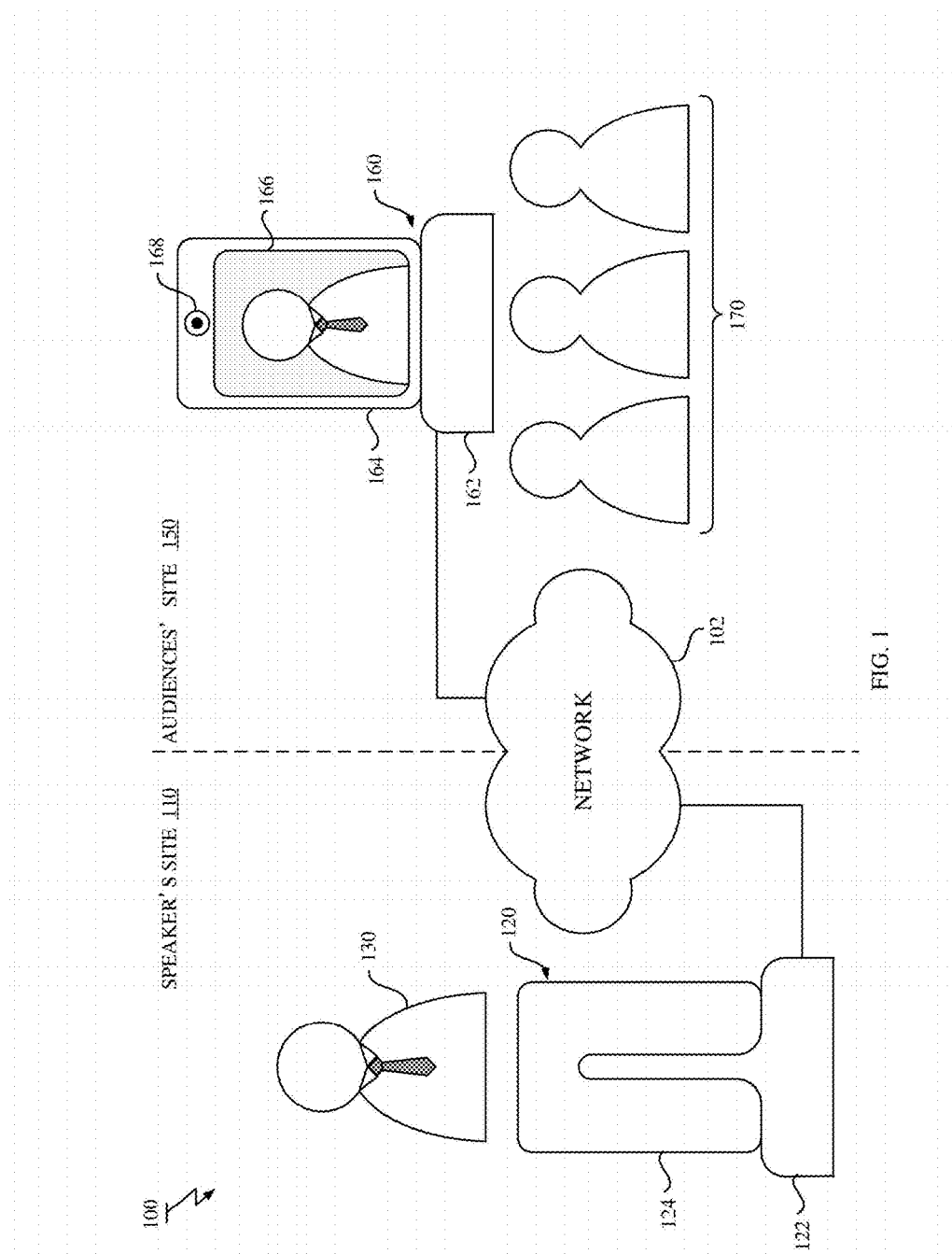
FIG. 1 illustrates a schematic of a tele-presence system used for a remote lecture class according to an exemplary embodiment of the present invention.

Referring to FIG. 1, there is shown a schematic of a tele-presence system 100 used for a remote lecture class according to an exemplary embodiment of the present invention. There are mainly two sites that includes a speaker's site 110 for a speaker (e.g. a lecturer) 130 and an audiences' site 150 for audiences (e.g. students) 170. In each site 110, 150, a tele-presence robot 120, 160 is provided in order to enhance social presence within communications between the speaker 130 and the audiences 170. The tele-presence robots 120, 160 have a connection via a network 102 to communicate each other. The network 102 can include, but not limited to, a local area network (LAN), a general wide area network (WAN), a public network (e.g., the Internet, cellular network), etc.

As shown in FIG. 1, each tele-presence robot 120, 160 has a body 122, 162 and a head 124, 164. Each head 124, 164 has a face that is equipped with a display 166 (not shown for the robot 120) and a camera 168 (not shown for the robot 120). In the describing embodiment, the head 124, 164 is movable by actuators in two axes so that the head 124, 164 accordingly its face can pan and tilt independently from the body 122, 162. However, this is an example of possible designs for at least one embodiments of the present invention. In other embodiments, the head can be movable in one axis or more than two axes, the display (or a face) and the camera (or an eye) can be separately movable in at least one axes.

In the tele-presence system 100, the tele-presence robots 120, 160 can physically embody one participant to other participant(s) each other. A view taken by the camera of the tele-presence robot 120 in the speaker's site 110 is transmitted to the tele-presence robot 160 in the audiences' site 150 via the network 102 to show the view (e.g. a face of the speaker 130) in the speaker's site 110 by the display 166, and vice versa. The tele-presence robot operated in a master mode (e.g. the robot 120 in the speaker' site 110) can detect and track the face of the speaker by the camera, and show a sight in the audiences' site 150 by the display from the viewpoint of a buddy robot, that is the tele-presence robot operated in a slave mode (e.g. the robot 160 in the audiences' site 150). The tele-presence robot operated in the slave mode (e.g. the robot 160) can show the speaker's face by the display 166 and pan and tilt the head 164 along with a movement of the face of the speaker 130.

Figure 2:
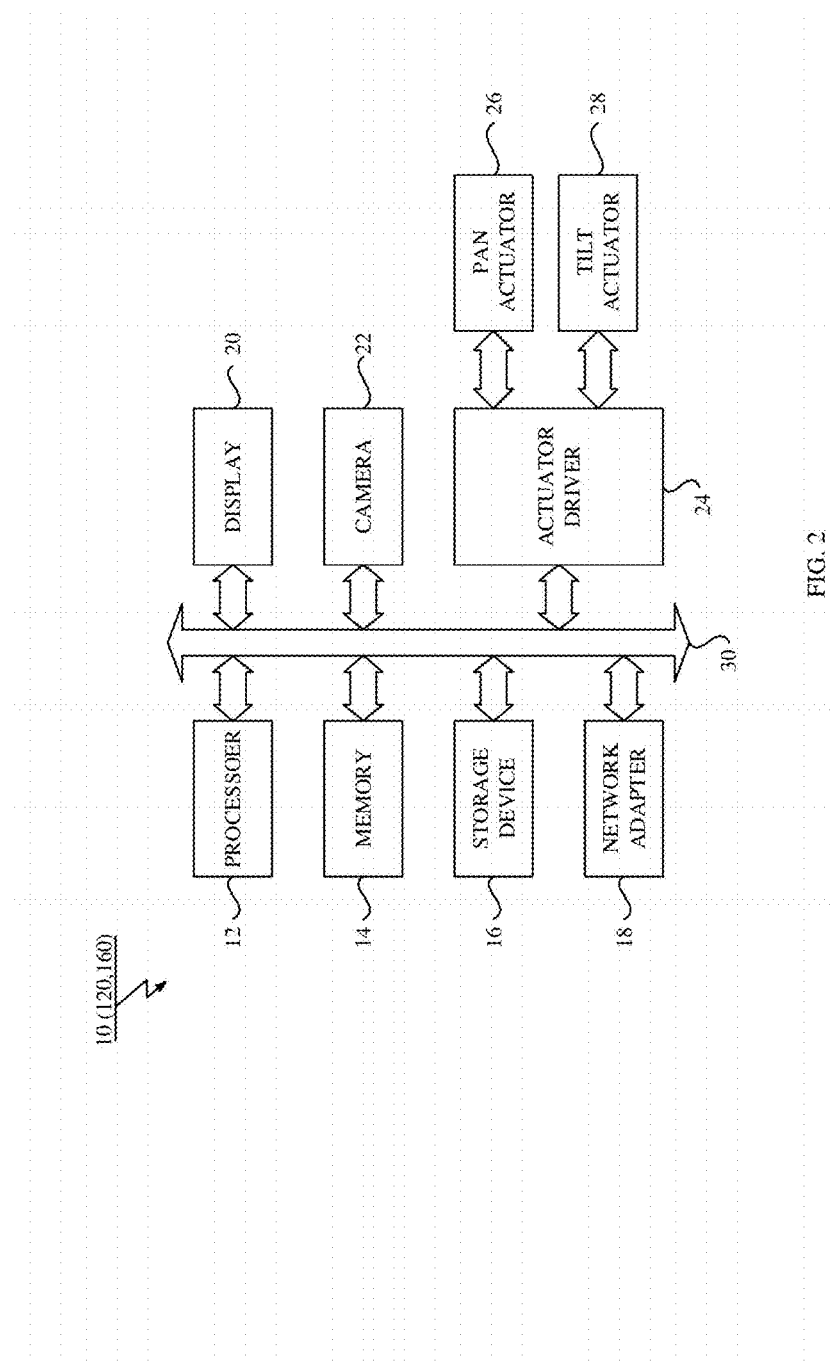
FIG. 2 depicts a hardware configuration of a tele-presence robot including a computing device according to the exemplary embodiment of the present invention.

Referring now to FIG. 2, a schematic of a hardware configuration of a tele-presence robot 10 (corresponds to each tele-presence robot 120, 160 shown in FIG. 1) is depicted. The tele-presence robot 10 shown in FIG. 2 is only one example of a suitable tele-presence robot and is not intended to suggest any limitation as to the scope of use or functionality of embodiments of the invention described herein. Regardless, the tele-presence robot 10 is capable of being implemented and/or performing any of the functionality set forth herein below.

The components of the tele-presence robot 10 can include, but are not limited to, a processor (or processing unit) 12 and a memory 14 coupled to the processor 12 by a bus 30 that couples various system components including the memory 14 to the processor 12. The bus 30 represents at least one of any of several types of bus structures, including a memory bus or memory controller, a peripheral bus, an accelerated graphics port, and a processor or local bus using any of a variety of bus architectures.

The tele-presence robot 10 typically includes a variety of computer readable media. Such media can be any available media that is accessible by the tele-presence robot 10, and it includes both volatile and non-volatile media, removable and non-removable media.

The memory 14 can include computer readable media in the form of volatile memory, for example random access memory (RAM). The tele-presence robot 10 can further include other removable/non-removable, volatile/non-volatile storage media. By way of example only, the storage device 16 can be provided for reading from and writing to a non-removable, non-volatile magnetic media. As will be further depicted and described below, the storage device 16 can include at least one program product having a set (e.g., at least one) of program modules that are configured to carry out the functions of embodiments of the invention.

Program/utility, having a set (at least one) of program modules, can be stored in the storage device 16 by way of example, and not limitation, as well as an operating system, at least one application programs, other program modules, and program data. Each of the operating system, at least one application programs, other program modules, and program data or some combination thereof, can include an implementation of a networking environment. Program modules generally carry out the functions and/or methodologies of embodiments of the invention as described herein.

The tele-presence robot 10 can also include at least one peripherals for example a display 20, a camera 22, an actuator driver 24 that drives pan and tilt actuators 26, 28, and a network adapter 18 that enable the tele-presence robot 10 to communicate with at least one other tele-presence robots or computing devices. The tele-presence robot 10 can communicate with the network 102 for example LAN, WAN, and/or a public network (e.g., the Internet) via the network adapter 18. As depicted, the network adapter 18 communicates with the other components of the tele-presence robot 10 via the bus 30.

As shown in FIG. 2, the tele-presence robot 10 is described in a form of a single apparatus that includes all of robotic mechanisms 24, 26, 28, the display 20, the camera 22 and a computing device for controlling the robotic mechanism, the display 20 and the camera 22. However, in other embodiments, the components of the tele-presence robot 10 can be provided separately in a variety of forms and coupled via an interface or a network for example universal serial bus (USB), WiFi® communication, Bluetooth® communication and other computer bus and power connectors to make up the tele-presence robot 10.

In a particular embodiment, a processor, a memory, a storage device, a network adapter, a display and a camera are provided as a computer system and robotic mechanisms including an actuator driver, actuators and other mechanics are provided as external peripherals or accessories for the computer system. In the particular embodiment, the computer system is operational with numerous general purpose or special purpose computing system environments or configurations. Examples of well-known computing systems, environments, and/or configurations, that can be suitable for use with the tele-presence robot 10 include, but are not limited to, tablet computer systems, smartphones, mobile devices, personal computer systems, hand-held or laptop devices, multiprocessor systems, microprocessor-based systems, set top boxes, single board computer systems, compute sticks, programmable consumer electronics, network PCs, minicomputer systems, and the like. It should be understood that although not shown, other hardware and/or software components can be used in conjunction with the tele-presence robot 10.

Referring again to FIG. 1, in the tele-presence system 100, the speaker 130 can control remotely the tele-presence robot 160 equipped in the audiences' site 150 by moving their part for example a face, a head and a body in front of the tele-presence robot 120 equipped in the speaker's site 110.

Generally, the speaker 130 does not want to perform operation-specific actions (for example pressing key in a keyboard, manipulating lever and button in a controller device) during cognitively complex tasks and does not want to wear any additional device (for example HMD) to sense the movement of the speaker 130, which can disturb natural facial expression of the speaker 130. Also awkward behaviors of the robot due to an unintentional movement of the speaker 130 for example looking aside to see a document should be considered. Presentations of the unintentional movements can significantly affect the social presence of the speaker 130. However, there is no known technique that can reconcile naturally operational, intentional movements and presentational, unintentional movements for the tele-presence robot in the tele-presence systems.

Therefore, there are needed methods, associated tele-presence systems and computer programs for generating a control signal for a tele-presence robot or controlling the tele-presence robot, capable of expressing natural embodiment of an operator (e.g. speaker in a remote lecture class) with the tele-presence robot based on a movement of the operator, without requiring any additional equipment that disturbs natural facial expression of the operator and giving much cognitive load on the operator.

In at least one embodiments according to the present invention, a novel process for generating a control signal for a tele-presence robot (accordingly controlling the tele-presence robot) in one site (e.g. the audiences' site 150) is performed by a computing device based on a movement of an operator in other site (e.g. the speaker's site 110), in which intentional and unintentional movements of the operator are detected discriminately based on working of a camera that acquires an image of the operator for example a face of the operator. The computing device can be included in or connected to the tele-presence robot on the one site or a tele-presence robot on the other site.

During the process, the computing device calculates a direction where the face of the operator is positioned based on the camera, in which the direction indicates an intentional movement of the operator. The computing device further calculates an orientation where the face of the operator points, in which the orientation indicates an unintentional movement of the operator. Then, the computing device generates at least one motion parameters of the tele-presence robot based on the direction in combination with the orientation so as to control motion of the tele-presence robot in the one site. The direction and the orientation are reflected to the at least one motion parameters of the tele-presence robot differently. Therefore, operational and presentational movements of the operator for the tele-presence robot are naturally reconciled.

Figure 3:
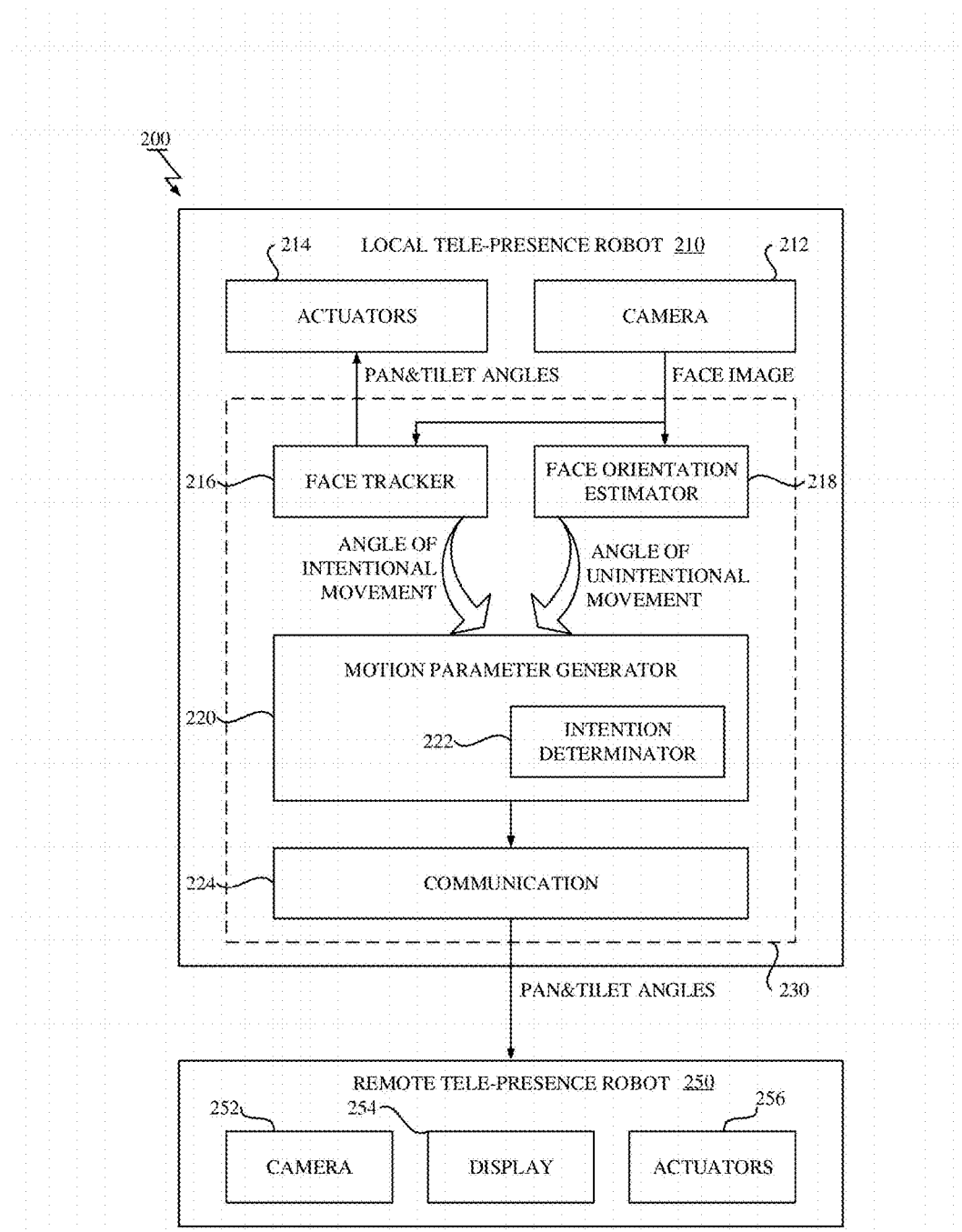
FIG. 3 depicts a block diagram of the tele-presence system according to the exemplary embodiment of the present invention.

Now, referring to the FIG. 3 with FIG. 4, it will be described the tele-presence system for controlling a tele-presence robot according to the exemplary embodiment of the present invention, in more detail. FIG. 3 depicts a block diagram of the tele-presence system. As shown in FIG. 3, the block diagram 200 of the tele-presence system 100 includes a block diagram 210 of the local tele-presence robot (e.g. tele-presence robot 120 shown in FIG. 1) operated in the master mode and a block diagram 250 of the remote tele-presence robot (e.g. tele-presence robot 160 shown in FIG. 1) operated in the slave mode. In the describing embodiment, the computing device 230 is embedded in the local tele-presence robot 210. However, in other embodiments, the computing device 230 can be embedded in the remote tele-presence robot 250, or connected to any one of the tele-presence robots 210, 250.

The local tele-presence robot 210 can include a camera 212 that acquires an image of the face of the operator; actuators 214 that change at least orientation of the camera 212; a face tracker 216, a face orientation estimator 218; a motion parameter generator 220; and a communication 224.

Figure 4A:
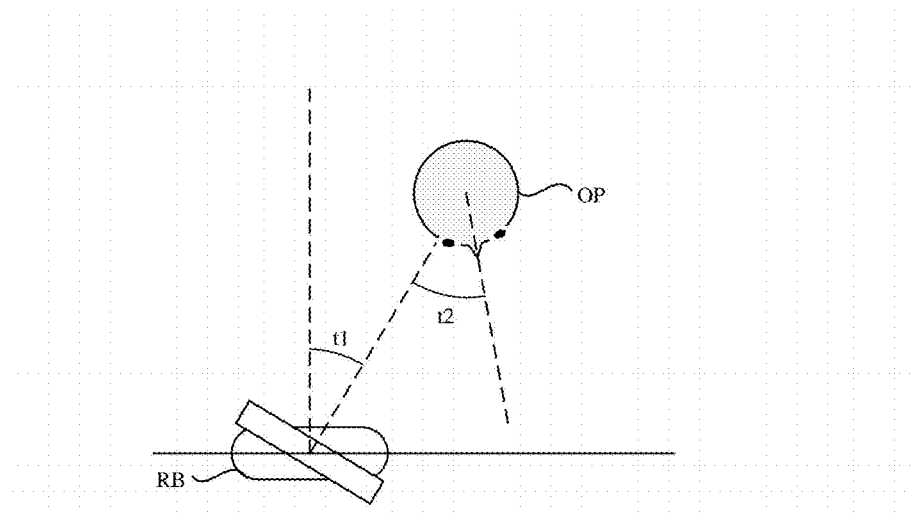
FIG. 4A describes angles of an intentional movement and an unintentional movement of an operator according to the exemplary embodiment of the present invention.

The face tracker 216 and the face orientation estimator 218 are configured to calculate angles of an intentional movement and an unintentional movement of the operator, respectively. FIG. 4A describes the angles of the intentional movement and the unintentional movement of the operator.

Figure 4B:
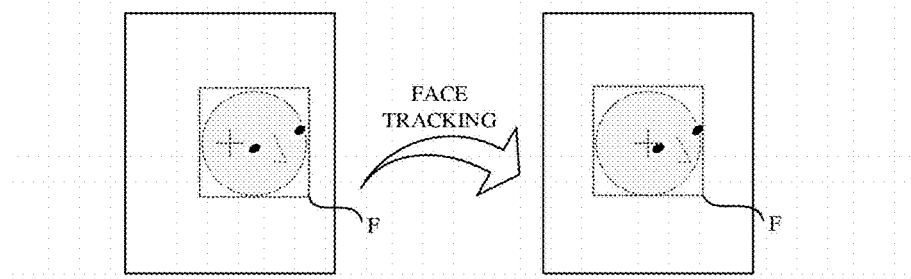
FIG. 4B describes a face tracking processing for detecting a direction of the face of the operator by the computing device according to the exemplary embodiment of the present invention.

The face tracker 216 is configured to track the face of the operator OP in the center of view of the camera 212 by adjusting pan and tilt angles of the camera 212, which are parameters of the actuators 214 actuating the camera 212. FIG. 4B describes a face tracking processing for detecting a direction of the face of the operator OP. As shown in FIG. 4B, the face tracker 216 attempts to recognize a human face in the view by image analysis to detect the position of the operator's face F in the view and adjusts the pan and tilt angles based on current pan and tilt angles and the detected position of the operator's face F in the view so as to catch the operator's face F at the center of the view (depicted as a dashed cross) by any known techniques for example feedback techniques.

The face tracker 216 can calculates the direction, t1, where the face of the operator OP is positioned with respect to the body of the local tele-presence robot 210 based on the image obtained by the camera 212. The direction, t1, is defined by an angle (to be accurate, it can include a horizontal and vertical angles) against the direction of the robot's body RB. The angle of the direction, t1, can be simply calculated based on the pan and tilt angles currently set to the actuators 214. Alternatively, the angle of the direction, t1, can be calculated based on the detected position of the operator's face F in the view and the current pan and tilt angles. The angle of the direction, t1, indicates the intentional movement of the operator. The face tracker 216 constitutes a direction calculator in the describing embodiment.

In a particular embodiment, the direction, t1, can be calculated by a following formula under a given angle of view, A, of the camera 212:

$$t1 = \mathrm{atan}\left(\tan\left(\frac{A}{2}\right) * \left(\frac{2*x}{w} - 1\right)\right) \quad \text{[Formula 1]}$$

where x denotes the detected center position of the face F in pixels, w denotes the number of pixels in the view. In the above formula, "tan" denotes tangent function and "a tan" denotes an inverse function of the tangent function. To be accurate, the direction, t1, can be calculated in both horizontal and vertical axis.

In the describing embodiment, the face tracker 216 tracks the face of the operator OP in the center of the view of the camera 212 to calculate the direction, t1. This configuration can increase the range of the operation. However, in other embodiment, the view of the camera 212 can be fixed. In the other embodiment, the angle of the direction, t1, can be calculated based on the detected position of the operator's face F in the view directly without moving pan and tilt angles.

Figure 4C:
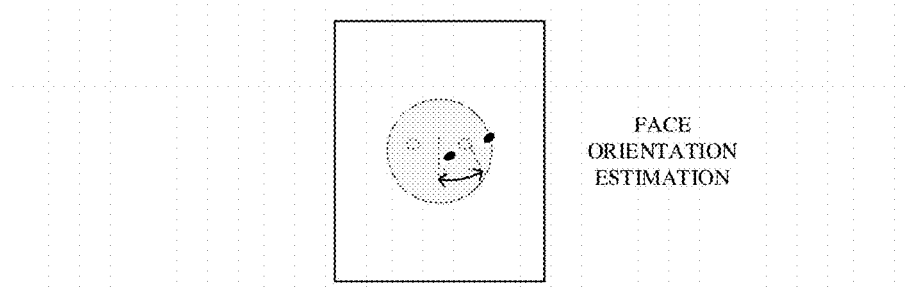
FIG. 4C describes an estimation processing for estimating an orientation of the face of the operator by the computing device according to the exemplary embodiment of the present invention.

The face orientation estimator 218 is configured to estimate an orientation of the face of the operator by analyzing the image obtained by the camera 212. FIG. 4C describes an estimation processing for estimating the orientation of the face of the operator. The image can be binary image, grayscale image or color image without or with distance information, depending on functionality of the camera 212. The face orientation estimator 218 can recognize salient facial features for example a nose, eyes and lips in the image to locate the positions of the facial features and calculate a face orientation based on the located positions of the facial features, by using any known face orientation estimation techniques.

The face orientation estimator 218 can calculates the orientation, t2, where the face of the operator points based on the image obtained by the camera 212. The face orientation, t2, is defined by an angle (to be accurate, it can include a horizontal and vertical angles) against normal orientation where the operator's face just opposes to the display of the robot. The angle of the orientation, t2, indicates an unintentional movement of the operator. The face orientation estimator 218 constitutes an orientation calculator in the describing embodiment.

In a particular embodiment, the orientation, t2, can be calculated by a following formula with assuming the size of the human face;

$$t2 = \mathrm{asin}\left(\frac{\mathrm{abs}(x-1)}{r}\right) \quad \text{[Formula 2]}$$

where x denotes the detected position of nose, l denotes the detected center position of the facial region, r denotes the depth from cervical spine to the nose. In the above formula "abs" denotes absolute function and "a sin" denotes an inverse function of sine function. However, this is an example of possible implementation in at least one embodiments of the present invention. When the orientation is calculated based on an image, various facial features can be used. In other embodiments, center position of an eye or mouth can be used to calculate variable r, x instead of the nose.

In further other particular embodiment, the orientation, t2, can be calculated directly by using a tiny gyro-sensor attached at the head of the operator. In the describing embodiment, the orientation, t2, is face orientation of the operator, however, this is an example of possible orientation applicable in at least one embodiments of the present invention. In other embodiments, a gaze orientation of the operator measured by using any known gaze orientation estimation techniques can be used in place of or in combination with the face orientation.

The motion parameter generator 220 determines how the remote tele-presence robot 250 moves based on the direction, t1, and the orientation, t2. The motion parameter generator 220 is configured to generate at least one motion parameters of the remote tele-presence robot 250 as a control signal based on the direction, t1, in combination with the orientation, t2, in which the direction, t1, and the orientation, t2, are reflected to the at least one motion parameters differently. The at least one motion parameters can include at least one of the pan and tilt angles in the describing embodiment.

The motion parameter generator 220 can include an intention determiner 222 that is configured to determine whether the operator focuses on the display or not based on at least one of the direction, t1, and the orientation, t2. In a particular embodiment, the orientation, t2, which indicates the unintentional movement of the operator, can be preferably used to determine whether the operator focuses on the display or not. The motion parameter generator 220 can put weight to the direction, t1, and the orientation, t2, differently according to the result by the intention determiner 222.

In a preferable embodiment, the motion parameter generator 220 sets a heavier weight to the direction, t1, and a lighter weight to the orientation, t2, in a case where the operator focuses on the display. If the operator focuses on the display of the local tele-presence robot 210, change of the face position is considered to be intentional. Thus, change in the direction, t1, can be emphasized. On the other hand, in a case where the operator focuses on out of the display, the motion parameter generator 220 sets a lighter weight to the direction, t1, and a heavier weight to the orientation, t2. If the operator focuses on out of the display for example on a document, change of the face position is considered to be unintentional. The operator can move his or her head to see the document. Thus, change in the direction, t1, can be suppressed. Processing of motion parameter generation will be described later in more detail.

The communication 224 is configured to submit the generated motion parameters to the remote tele-presence robot 250 so as to control movement of the remote tele-presence robot 250.

The remote tele-presence robot 250 can include a camera 252 configured to collect information around the remote tele-presence robot 250; a display 254 configured to show the face of the operator to the audiences; and actuators 256 configured to actuate at least one of the camera 252 and the display 254 along at least one axis. When the remote tele-presence robot 250 receives the motion parameters from the local tele-presence robot 210, the remote tele-presence robot 250 sets parameters to the actuators 256 based on the received motion parameters. The head accordingly its face can be moved with the camera 252 to provide the information around the remote tele-presence robot 250 to the operator in front of the local tele-presence robot 210. Simultaneously, the remote tele-presence robot 250 expresses behavior of the operator based on the movement of the operator so as to convey his/her intent to the audience.

As shown in FIG. 3, the tele-presence system 200 includes at least one modules to provide various features and functions. These modules can be implemented in hardware, software or firmware executable on hardware, or a combination thereof. Also, these modules are presented only by way of example and are not intended to suggest any limitation. Alternative embodiments can include additional or fewer modules than those illustrated in FIG. 3, or the modules can be organized differently. Furthermore, it should be recognized that, in some embodiments, the functionality of some modules can be broken into multiple modules or, conversely, the functionality of several modules can be combined into a single or fewer modules.

Now, referring to the FIG. 5 with FIG. 6, it will be described a process (corresponds to a method) for controlling the tele-presence robot based on the movement of the operator in the tele-presence system according to the exemplary embodiment of the present invention.

Figure 5:
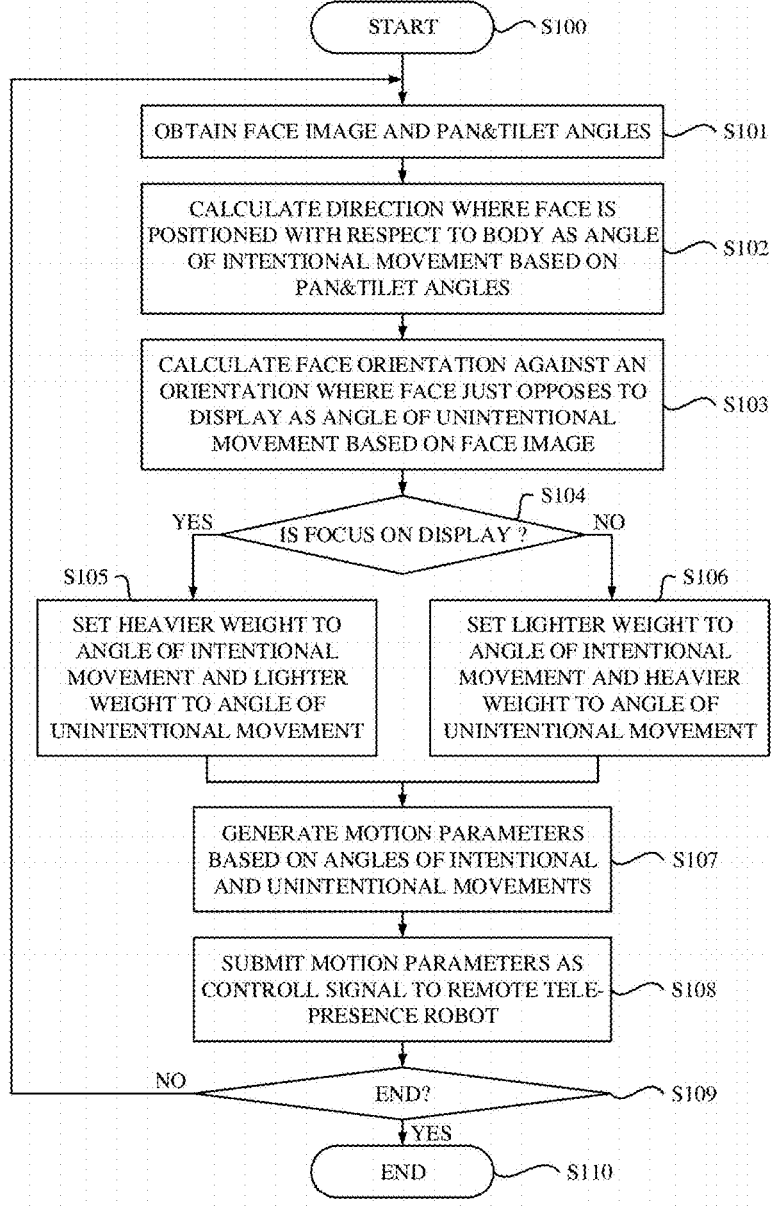
FIG. 5 is a flowchart depicting a process for controlling the tele-presence robot based on the movement of the operator according to the exemplary embodiment of the present invention.

FIG. 5 shows a flowchart depicting the process for controlling the tele-presence robot based on the movement of the operator. As shown in FIG. 5, the process begins at step S100 in response to start up the local tele-presence robot 210 and establishing a session with the remote tele-presence robot 250 as a buddy robot. Note that the process shown in FIG. 5 is performed by the computing device 230 depicted in FIG. 3.

At step S101, the computing device 230 obtains a face image from the camera 212 and the current pan and tilt angles set to the actuators 214 if necessary.

At step S102, the computing device 230 calculates the direction where the face is positioned with respect to the body of the local tele-presence robot 210 as the angle of the intentional movement of the operator by the face tracker 216 based on the current pan and tilt angles and the face image if necessary. The angle of the direction, t1, can be simply calculated from the current pan and tilt angles, based on the current pan and tilt angles in combination with the detected position of the operator's face in the image, or based on merely the detected position of the operator's face in the image.

At step S103, the computing device 230 calculates the orientation of the operator's face against the normal orientation where the face just opposes to the display as the angle of the unintentional movement of the operator by the face orientation estimator 218 based on the face image.

At step S104, the computing device 230 determines whether the focus of the operator is on the display by the intention determiner 222 based on at least one of the direction, t1, and the orientation, t2. In a preferable embodiment, the orientation, t2, which indicates the unintentional movement of the operator, can be used to determine whether the focus of the operator is on the display or not. In a particular embodiment, the degree of the unintentionality of the operator to the display can be estimated by t2/K, where K denotes normalization constant. In contrast, the degree of the intentionality of the operator to the display can be estimated by 1−t2/K.

If the computing device 230 determines that the focus of the operator is on the display in the step S104, the process branches to the step S105. In the particular embodiment, if the degree of the unintentionality, t2/K, is less than a threshold, the computing device 230 determines that the focus of the operator is on the display. At step S105, the computing device 230 sets the heavier weight to the angle of the intentional movement, t1, and the lighter weight to the angle of the unintentional movement, t2, by the motion parameter generator 220.

On the other hand, if the computing device 230 determines that the focus of the operator is out of the display in the step S104, the process branches to the step S106. At step S106, the computing device 230 sets a lighter weight to the angle of the intentional movement, t1, and a heavier weight to the angle of the unintentional movement, t2, by the motion parameter generator 220.

At step S107, the computing device 230 generates the motion parameters of the remote tele-presence robot 250 based on the angle of the intentional movement, t1, and the angle of the unintentional movement, t2, with weights set at step S105 or S106, by the motion parameter generator 220.

Figure 6A:
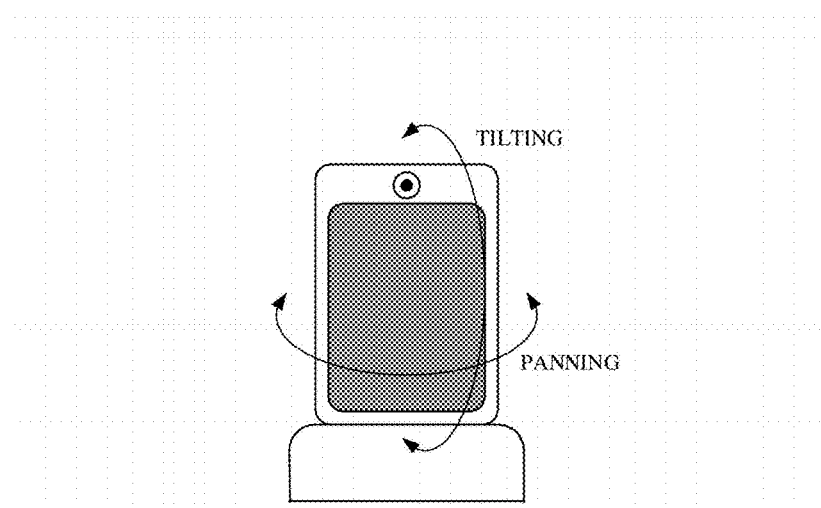
FIG. 6A describes motion parameters of the remote tele-presence robot according to the exemplary embodiment of the present invention.

FIG. 6A describes motion parameters of the remote tele-presence robot 250 according to the exemplary embodiment. FIG. 6A shows the remote tele-presence robot 250 in which the camera and the display are simultaneously movable in two axes by the pan and tilt actuators.

In a particular embodiment in relation to the remote tele-presence robot 250 shown in FIG. 6A, steps from S104 to S107 can be done by calculating an angle (to be accurate, it can include a pan and tilt angles) of the head of the remote tele-presence robot 250, T, determined by a following formula:

$$T = f(t1, t2) = t1 * M * \left(1 - \frac{t2}{K}\right) + t2 * N * \left(\frac{t2}{K}\right) \qquad \text{[Formula 3]}$$

wherein t1 denotes the direction, t2 denotes the orientation and M, N and K denote predetermined constants, respectively. The constant for the direction, M, can be tuned so that the operator can sweep around in the audiences' site by a small movement. The constant for the orientation, N, can be tuned so as to adjust presentation of the unintentional movement. The direction, t1, and the orientation, t2, are reflected to the motion parameter, T, differently.

The t2/K represents the degree of the unintentionality of the operator whereas (1−t2/K) represents the degree of the intentionality of the operator. The degree of the unintentionality, t2/K, and the degree of the intentionality, 1−t2/K can change in an opposite manner. The degree of the unintentionality, t2/K, increases with decreasing the degree of the intentionality, 1−t2/K, and vice versa. The degree of the unintentionality, t2/K, give the heavier weight to the orientation, t2, and lighter weight to the direction, t1 if the degree of the unintentionality, t2/K, exceeds the threshold value (0.5).

In a particular preferable embodiment, if the constant M is set to be positive value, the constant N is set to be negative value so that the direction, t1, and the orientation, t2, are reflected to the movement of the tele-presence robot 250 in an opposite manner.

FIG. 7A illustrates movements of the tele-presence robots by an intentional movement of the operator according to the particular preferable embodiment of the present invention. On the other hand, FIG. 7B illustrates other movements of the tele-presence robots by an unintentional movement of the operator.

As shown in FIG. 7A, when the speaker 130 changes his/her face position intentionally toward the display of the local tele-presence robot 120 in the speaker's site 110, the local tele-presence robot 120 follows the operator's face and the remote tele-presence robot 160 rotates its head in a point symmetric manner to the speaker's motion. When the speaker moves to his/her right-hand side, the remote robot 160 rotates its head to collect information on its left hand side.

In contrast, when the speaker 130 changes his/her face orientation from the normal orientation where the face just opposes to the display of the local tele-presence robot 120 in the speaker's site 110 as shown in FIG. 7B, the remote tele-presence robot 160 rotates its head in an opposite manner, which is a synchronized manner to the speaker's motion. When the speaker moves his/her head to left-hand side, the remote robot 160 rotates its head to collect information on its left hand side.

Now referring back to the FIG. 5, at step S108, the computing device 230 submits the generated motion parameters as a control signal to the remote tele-presence robot by the communication 224.

At step S109, the computing device 230 determines whether the control is ended or not. If the computing device 230 determines that the control is not ended in step S109, then the process loops back to step S101. On the other hand, if the computing device 230 determines that the control is ended in step S109, then the process branches to the step S110 to end the process. When the tele-presence robot 210 is shut down or disconnected to the buddy robot, the computing device 230 can determine that the control has been ended.

In the describing embodiment, steps are described to be executed in an order shown in the FIG. 5. However, in other embodiments, any steps shown in FIG. 5 can be executed in a variety of orders. Especially, the steps of S102 and S103 may be executed in reverse order, or in parallel.

According to the novel process shown in FIG. 5, natural embodiment of the operator can be expressed with the remote tele-presence robot based on the movement of the operator without requiring any additional equipment that disturbs natural facial expression of the operator for example HMD and without giving much cognitive load on the operator. The operator can switch his or her operational movements and unintentional movements to be submitted without any explicit actions so as to reconcile operation with the operator's intention and presentation for improving the social presence in the absence of operator's intention without giving any cognitive load on the operator.

The tele-presence robot described herein can be used as an avatar of the operator in remote classes, workshops or collaborative works. The hardware configuration of the tele-presence robot can be simplified to reduce the cost in manufacturing and operating (e.g. setup, maintenance, etc.) of the tele-presence robot.

In at least one other embodiments of the present invention, the motion parameters of the remote tele-presence robot can include at least one of at least one angles of a part (for example head, face, eyes, etc.) of the remote tele-presence robot, at least one angles of a camera mounted in the remote tele-presence robot, at least one angles of a display mounted in the remote tele-presence robot and at least one angles of a set of a camera and a display mounted in the remote tele-presence robot.

Now, referring to the FIG. 6B, it will be described a tele-presence robot according to other exemplary embodiment of the present invention, in which the camera and the display are separately movable in each two axes by each pan and tilt actuators.

Figure 6B:
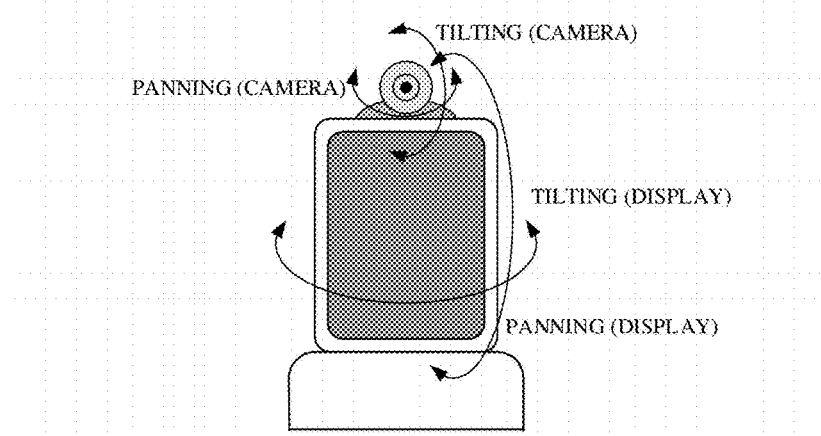
FIG. 6B describes motion parameters of a remote tele-presence robot according to other exemplary embodiment of the present invention.

In the particular embodiment shown in FIG. 6B, the at least one motion parameters of the tele-presence robot include a plurality of parameters, each of which corresponds to a different part (e.g. face or display and eyes or camera) of the remote tele-presence robot. In this embodiment, each parameter can be determined by a different function with respect to the direction, t1, and the orientation, t2.

In a particular embodiment in relation to the remote tele-presence robot shown in FIG. 6B, steps from S104 to S107 shown in FIG. 5 can be done by calculating an angle of the display, $T_d$, and an angle of the camera, $T_c$, each of which is determined by each following formula:

$$T_d = f_d(t1, t2) = t1 * M_d * \left(1 - \frac{t2}{K_d}\right) + t2 * N_d * \left(\frac{t2}{K_d}\right) \quad \text{[Formula 4]}$$

$$T_c = f_c(t1, t2) = t1 * M_c * \left(1 - \frac{t2}{K_c}\right) + t2 * N_c * \left(\frac{t2}{K_c}\right)$$

wherein t1 denotes the direction, t2 denotes the orientation and $M_d$, $M_c$, $N_d$, $N_c$, $K_d$ and $K_c$ denote predetermined constants, respectively.

According to the other embodiment, natural embodiment of the operator can be expressed more finely with the remote tele-presence robot based on a movement of the operator, in which the movement of the display can be controlled separately from that of the camera.

The present invention can be a computer system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device for example punch-cards or raised structures in a groove having instructions recorded thereon, and any suitable combination of the foregoing. A computer readable storage medium, as used herein, is not to be construed as being transitory signals per se, for example radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming languages, including an object oriented programming language for example Smalltalk, C++ or the like, and conventional procedural programming languages, for example the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes at least one executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of at least one other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of at least one aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a control signal for a tele-presence robot by a computing device of an operator having a first camera and a first display based on a movement of the operator having a face, wherein the tele-presence robot having a movable head with a second camera and a second display, the method comprising:
calculating a direction where at least part of the operator is positioned based on the first camera acquiring an image of the at least part of the operator, wherein the direction is reflected in a point symmetric manner;
calculating an orientation where the face of the operator points, wherein the orientation is reflected in a synchronized manner from the movement of the operator to the movement of the tele-presence robot; and
generating at least one motion parameters for the movable head of the tele-presence robot as the control signal based on the direction in combination with the orientation;
wherein the direction and the orientation are reflected to the at least one motion parameters differently, wherein the at least one motion parameters includes at least one pan angle and at least one tilt angle.

2. The method of claim 1, the method further comprising:
determining whether the operator focuses on the first display equipped with the first camera based on at least one of the direction and the orientation, wherein the first display shows a view of the tele-presence robot;
wherein the generating comprises weighting the direction and the orientation differently according to a result of the determining.

3. The method of claim 2, wherein the weighting comprises:
setting a heavier weight to the direction and setting a lighter weight to the orientation in a case where the operator focuses on the first display.

4. The method of claim 2, wherein the weighting comprises:
setting a lighter weight to the direction and setting a heavier weight to the orientation in a case where the operator focuses on out of the first display.

5. The method of claim 1, wherein the at least one motion parameters of the tele-presence robot includes a plurality of parameters each corresponding to a different part of the tele-presence robot, each parameter being determined by a different function with respect to the direction and the orientation.

6. The method of claim 1, wherein the at least one motion parameters of the tele-presence robot includes at least one of at least one angles of a part of the tele-presence robot, at least one angles of the second camera mounted in the tele-presence robot, at least one angles of the second display mounted in the tele-presence robot and at least one angles of a set of the second camera and the second display mounted in the movable head of the tele-presence robot.

7. The method of claim 1, wherein the at least one motion parameters of the movable head of the tele-presence robot includes an angle of the tele-presence robot, T, determined by a following formula:

$$T = f(t1, t2) = t1 * M * \left(1 - \frac{t2}{K}\right) + t2 * N * \left(\frac{t2}{K}\right)$$

wherein t1 denotes the direction, t2 denotes the orientation and M, N and K denote predetermined constants, respectively.

8. The method of claim 1, wherein the at least part of the operator is the face of the operator, and the tele-presence robot has the second display that shows the face of the operator, the second camera that collects information around the tele-presence robot and at least one actuator that rotates at least one of the second camera and the second display along at least one axis.

9. The method of claim 1, wherein the computing device is an additional tele-presence robot.

10. A tele-presence system comprising:
a computing device of an operator having a first camera and a first display that generates a control signal for a tele-presence robot based on a movement of the operator having a face, wherein the tele-presence robot having a movable head with a second camera and a second display, wherein the control signal includes:
a direction calculated where at least part of the operator is positioned based on the first camera acquiring an image of the at least part of the operator, wherein the direction is reflected in a point symmetric manner;
an orientation calculated where the face of the operator points, wherein the orientation is reflected in a synchronized manner from the movement of the operator to the movement of the tele-presence robot; and
at least one motion parameters for the movable head of the tele-presence robot as the control signal based on the direction in combination with the orientation;
wherein the direction and the orientation are reflected to the at least one motion parameters differently, wherein the at least one motion parameters includes at least one pan angle and at least one tilt angle.

11. The tele-presence system of claim 10, wherein the computing device further comprises:
a generator that weights the direction and the orientation differently according to a result of determination.

12. The tele-presence system of claim 11, wherein the generator is further sets a heavier weight to the direction and set a lighter weight to the orientation in a case where the operator focuses on the first display.

13. The tele-presence system of claim 11, wherein the generator is further sets a lighter weight to the direction and set a heavier weight to the orientation in a case where the operator focuses on out of the first display.

14. The tele-presence system of claim 10, wherein the at least one motion parameters of the tele-presence robot includes a plurality of parameters each corresponding to a different part of the tele-presence robot, each parameter being determined by a different function with respect to the direction and the orientation.

15. The tele-presence system of claim 10, wherein the at least part of the operator is the face of the operator, the tele-presence system further comprising:
the tele-presence robot having remote the second display that shows the face of the operator, the second camera that collects information around the tele-presence robot and at least one actuator that rotates at least one of the second camera and the second display along at least one axis; and
a local robot embodying the operator, the local robot having the first camera that acquires an image of the face of the operator, the first display that shows a view of the tele-presence robot to the operator, and at least one local actuators that actuate at least one of the first camera and the first display.

16. The tele-presence system 11, wherein the computing device is an additional tele-presence robot.

17. A computer program for generating a control signal for a tele-presence robot having a first camera and a first display based on a movement of an operator having a face, wherein the tele-presence robot having a movable head with a second camera and a second display, the computer program having program instructions embodied therewith, the program instructions executable by a computer to cause the computer to perform a computer-implemented method comprising:

calculating a direction where at least part of the operator is positioned based on the camera acquiring an image of the at least part of the operator, wherein the direction is reflected in a point symmetric manner;

calculating an orientation where the face of the operator points, wherein the orientation is reflected in a synchronized manner from the movement of the operator to the movement of the tele-presence robot; and generating at least one motion parameters for the movable head of the tele-presence robot as the control signal based on the direction in combination with the orientation;

wherein the direction and the orientation are reflected to the at least one motion parameters differently, wherein the at least one motion parameters includes at least one pan angle and at least one tilt angle.

18. The computer program of claim 17, wherein the method further comprises:

determining whether the operator focuses on the first display equipped with the camera based on at least one of the direction and the orientation, the first display that shows a view of the tele-presence robot;

wherein the generating comprises weighting the direction and the orientation differently according to a result of the determining.

19. The computer program of claim 18, wherein the weighting comprises:

setting a heavier weight to the direction and setting a lighter weight to the orientation in a case where the operator focuses on the first display.

* * * * *